United States Patent [19]
Oister

[11] 3,721,980
[45] March 20, 1973

[54] GATED RANGE SEARCH RADAR

[76] Inventor: George K. Oister, 1109 Southeast 11th Street, Edmond, Okla. 73034

[22] Filed: Sept. 23, 1971

[21] Appl. No.: 183,083

[52] U.S. Cl. .................................. 343/9, 343/7.7
[51] Int. Cl. ............................................. G01s 9/44
[58] Field of Search .............................. 343/7.7, 9

[56] References Cited

UNITED STATES PATENTS

| | | | |
|---|---|---|---|
| 3,267,468 | 8/1966 | Stull, Jr. | 343/7.7 |
| 3,427,617 | 2/1969 | Richman | 343/9 |
| 3,500,400 | 3/1970 | Woerrlein | 343/9 |
| 3,526,894 | 9/1970 | Guilhem et al. | 343/9 |

*Primary Examiner*—Benjamin A. Borchelt
*Assistant Examiner*—G. E. Montone
*Attorney*—Jerry J. Dunlap et al.

[57] ABSTRACT

Radar apparatus particularly adapted for weather and search operations wherein reflected pulse energy is effectively time gated and separately filtered and processed for output display indication. The apparatus transmits relatively low power output energy in directive propagation and reflected energy is then mixed with a coherent signal to derive time-displaced doppler frequency electrical signals representative of energy returned. The time-displaced doppler frequency signals are then processed as resolution cells lying within a predetermined different energy time-displacement range, and doppler energy from each resolution cell is processed separately through characteristic filtering networks which provide individual data output for display in accordance with coordinates or parameters as derived from antenna scan information and energy travel times for the plurality of resolution cells.

11 Claims, 6 Drawing Figures

GATED RANGE SEARCH RADAR

BACKGROUND OF THE INVENTION

1. Field of the Invention

The invention relates generally to reduced power search radar systems and, more particularly, but not by way of limitation, it relates to improved radar apparatus wherein energy returned from individual resolution cells is separately processed to gain appreciable increase in signal-to-noise advantage.

2. Description of the Prior Art

The prior art includes various types of radar systems which are specifically adapted as to power requirements and frequency of operation for use in surface search, air search range tracking, and as may be constructed to respond to either pulse wave front or doppler frequency electrical signals. Within the particular area of weather and search radar there have been many and varied equipment designs operating in numerous frequency regions, and embodying specific structural features which enhance the equipments for their designed or selected functions. The forerunner radar types have consistently required a high peak power transmitting component such as the magnetron or klystron, with the received energy being conducted through a T-R assembly and receiver for input to signal processing equipment of more characteristic diversification. Here again, specific design inclusions such as doppler frequency signal processing capability have been employed as befits the intended applications of particular radar systems.

SUMMARY OF THE INVENTION

The present invention contemplates a radar system wherein transmitted and returned pulse energy is processed through a coherent system for derivation of pulse content within a plurality of individual, time-displaced resolution cells. In a more limited aspect, the invention consists of a relatively low power transmitter device and an antenna propagating directional energy through arcuate scan or other directed energy pattern; whereupon received pulse energy is amplified and mixed with a signal which is coherent in phase with the transmitted signal to derive a series of time-displaced doppler frequency electrical signals. The successive doppler frequency signals are then further gated to individual active filter networks in accordance with time or range displacement of the selected resolution cells, and the output from the individual active filter networks is then applied synchronously to a suitable output display.

Therefore, it is an object of the present invention to provide a radar system having operational range equivalent to that of conventional radar and much reduced transmitter power output requirements.

It is also an object of the invention to provide an apparatus for deriving indications that can be constructed entirely from solid state components having much less exacting power source requirements.

It is still further an object of the present invention to provide a radar apparatus useful in general search and navigation employ and which is lightweight and small in size.

It is yet another object of the present invention to provide a lightweight weather/search radar which consumes little power and obviates the need for rigid wave guide energy conduction.

Finally, it is an object of the present invention to provide a radar system that may be used for search, weather, heightfinding, terrain mapping, collision avoidance, crab angle detection, and other functions including glide slope angle determination, and which has a coherent transmitter and receiver serving to operate on received doppler return with a separate range gate for each range resolution cell in the interpulse period.

Other objects and advantages of the invention will be evident from the following detailed description when read in conjunction with the accompanying drawings which illustrate the invention.

DETAILED DESCRIPTION OF THE PREFERRED EMBODIMENT

Figure 1:
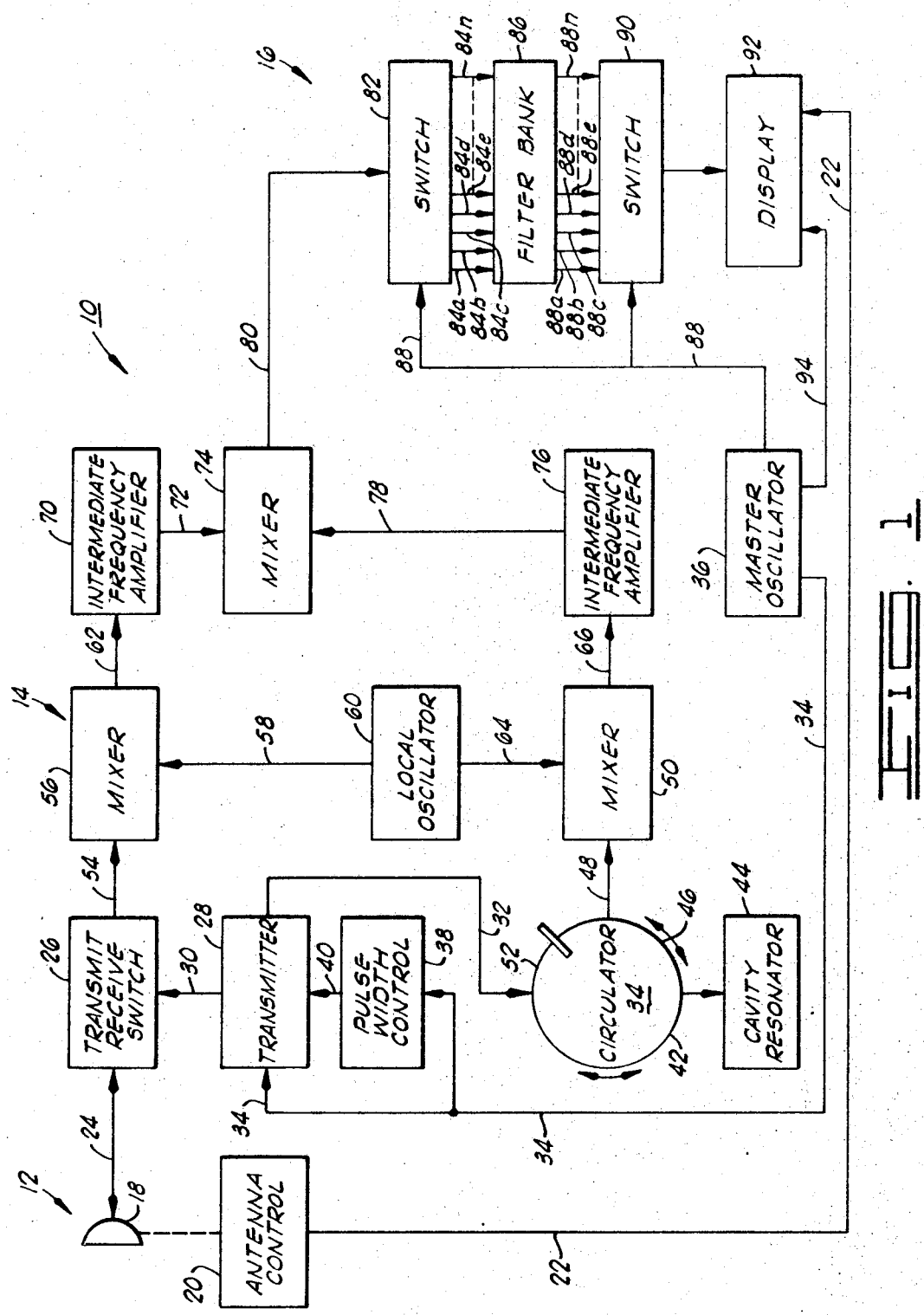
FIG. 1 is a block diagram of a radar system constructed in accordance with the present invention.

Referring now to FIG. 1, a gated range radar system 10 consists of an antenna system 12, transmitter-receiver 14 and a resolution cell defining filter circuitry 16. The antenna system 12 includes an antenna 18 which is controlled as to scan mode, bearing and angle of elevation by an antenna control 20. Antenna 18 may be any of the conventional and smaller types of highly directional radar antenna which would be compatible for usage at the lower power levels required by radar system 10. The antenna control 20 would also consist of conventional electromechanical components and circuitry for controlling the attitude of antenna 18 while transmitting bearing and/or angle of elevation information via line 22 for the purpose of controlling coordinated display, as will be further described below. Also, as will be further described below, it is contemplated that recent designs in uni-planar phased arrays will be employed for antenna 18 to provide an optimum function, especially where radar system 10 is employed in aircraft weather/search utility.

Energy applied to and from antenna 18 is conducted via line 24 to a transmit-receive switch 26. Due to the lower power requirements and overall efficiency of this particular radar system, the line 24 may be a semi-rigid coaxial cable in place of the usually required wave guide as specifically adapted for operational frequencies. In the same manner, all components of the system 10, including even a transmitter 28, may be constructed from solid state components due to the low average peak power at which the system is able to function without loss of range or effectiveness.

The transmitter 28 provides transmission energy output via line 30 to transmit-receive switch 26 while providing a second coherent energy output via line 32 to a circulator 34. Pulse repetition rate is controlled by input on line 34 from a master oscillator 36 which provides the system timing. The pulse repetition rates of system 10 may be the usual and conventional frequencies, e.g., variable about 250 pulses per second, and a pulse width control circuit 38, as triggered by the repetition frequency on line 34, provides pulse width control via input 40 so that selected different pulse widths of transmitted energy may be employed. For example, pulse width variation may span the range between 0.1 microseconds and 2 microseconds with appropriate selection being enabled, this being the range of pulse widths most often employed with weather or search radar equipment.

As previously stated, transmitter 28 need only have relatively low power requirements such that use of magnetrons and kylstrons is obviated; thus, the transmitter 28 may be such as the recently developed Impatt or Gun Diode solid state oscillators, and these components are presently available from such as Varian Associates of Palo Alto, Cal. Output 32 from transmitter 28 is applied to circulator 34 for the purpose of developing a coherent signal for use in the receiver section of transmitter-receiver 14. Circulator 34 is a ferrite device which allows free flow of energy about semicircular portion 42 in communication with a cavity resonator 44 as adapted in accordance with operational frequency requirements. Circulator 34 also allows free flow of energy around quarter-circular portion 46 between cavity resonator 44 and input lead 48 to a mixer circuit 50. The ferrite circulator 34 serves a function of blocking the exchange of any energy across quarter-circular portion 52 as disposed between transmitter output lead 32 and mixer input lead 48. The circulator 34 is also a commercially available device which is available from the Micromega division of Bunker-Ramo Corporation of Venice-Cal. The component specifically adapted for use in the 7 through 12 Gigahertz range is the Model XT23FC-5.

The output of received energy from transmit-receive switch 26 is applied via line 54 to a mixer circuit 56 which also receives input of local oscillator energy on line 58 from local oscillator 60. Local oscillator 60 is operational at a frequency displaced from the operational transmitter frequency to derive an intermediate frequency output on line 62 from mixer 56. The local oscillator 60 provides output at the same frequency on a line 64 to mixer 50 which derives a coherent intermediate frequency signal on output line 66 from mixer 50. Thus, energy derived from circulator 34 is in phase and coherent with the received energy applied on line 54 to mixer 56, and the intermediate frequency coherent signal output on lead 66 will also be coherent with the intermediate frequency on lead 62 as derived from the received energy.

Intermediate frequency signal from lead 62 is amplified in a conventional type of intermediate frequency amplifier 70 with output being applied on line 72 to a mixer circuit 74. Coherent signal on lead 66 is similarly applied through an intermediate frequency amplifier 76 which applies output on line 78 to mixer 74. The output from mixer 74 on lead 80 then includes only the doppler frequency components as caused by energy reflections from targets at specific relative speed differences as between the vehicle or craft carrying radar system 10 and the particular objects within energy range. The doppler frequency output on the lead 80 is then applied to the filtering circuitry 16 by input to a multiple output switch 82.

The multiple output switch 82 is comprised of conventional circuitry, e.g., diode switching circuitry, which provides serial, time-sliced output via leads 84a, 84b, 84c, 84d, 84e through 84n for input to separate, discrete filters within filter band 86, such individual filters to be further described below. The switching sequency out of switch 82 is controlled by a series of range resolution frequency pulses as applied on line 88 upon derivation from the master oscillator 36. The interpulse time-length between successive pulses of the range resolution frequency on line 88 determine the time width of the resolution cells relative to the incoming returned energy.

Outputs from the individual filters within filter bank 86 are conducted on a series of leads 88a, 88b, 88c, 88d, 88e through 88n for input to a switch 90. Output of signal information supplied by each of leads 88a through 88n is then supplied out of switch 90 synchronously as controlled by the range resolution frequency pulse input from lead 88 for application to a suitable display 92 indicating the information in selected coordinates. Pulse output representing range scan data from master oscillator 36 is applied via line 94 to the display 92, and the range scan data is related in frequency to the range resolution frequency pulse output on line 88 such that proper range coordination versus resolution cell input is applied to display 92. Angle scan information, as obtained from antenna control 20 via line 22, is also applied to complete the coordinated indication of data in conventional manner.

More specific circuitry for utilization in filter circuitry 16 (FIGS. 2 and 3) and for display circuit 92 (FIGS. 4, 5 and 6) will be further discussed below; however, it should be understood that conventional circuits of other and different types are available for carrying out the essence of the invention as set forth in FIG. 1. Therefore, prior to discussion of specific circuitry, the theory of operation and specific functional considerations are discussed immediately hereinafter.

The present invention overcomes the problem which arises because of the fact that each resolution cell of radar energy return, in range and angle, must compete with the noise of all resolution cells from an entire interpulse duration. Thus, each range resolution cell is divided for signal processing into an individual time gate of selected resolution cell time-length, and by so doing it is possible for the noise level to be lowered by the square root of the ratio of the number of resolution cells. Also, the placing of a range gate around each of the individual resolution cells allows that the system be made coherent and this, in turn, will provide an additional reduction in the band width. Reduction of the pre-detection band width further reduces any noise contribution at the radar receiver. Thus, it is possible that with typical band width reduction ratios on the order of 50 to 1, the over-all reduction in power may be as high as 2,000 or 2,500 to 1. There can actually be an advantage in reducing the power.

The transmitted wave form is of conventional type as the modulating signal will be an a periodic series of pulses. The pulse width will be noted by $\tau$ and the period between pulses will by noted by $T$. Thus, the modulating wave form can be described by the following series:

$$E(t) = [E_t - E(t-\tau) + E(t-T) - E(t-[T+\tau]) + \ldots ] \quad (1)$$

By taking the Laplace transform and combining terms, the power spectrum for this series becomes $$F(w) = \frac{\tau \sin \omega \frac{\tau}{2}}{\omega \frac{\tau}{2}} \left[ \cos n\omega \frac{T}{2} \right] \quad (2)$$

where $\omega$ equals angular frequency in radians and $n$ equals the number of pulses.

Upon modulation of the carrier frequency, the narrow band expression becomes $$F(\omega - \omega_0) = \tau \sin \frac{(\omega - \omega_0)\tau/2}{(\omega - \omega_0)\tau/2} [\cos n(\omega - \omega_0)\tau/2] \quad (3)$$

Energy return or the reflected signal from a distant object or target has approximately the same form except for the inclusion of the doppler frequency. The expression for the reflected signal then becomes $$F(\omega + \omega_d - \omega_0)$$
$$= \left[ \tau \sin \frac{(\omega + \omega_d - \omega_0)\tau/2}{(\omega + \omega_d - \omega_0)\tau/2} \right] \cdot [\cos n(\omega + \omega_d - \omega_0)\tau/2] \quad (4)$$

where $\omega_2$ equals angular frequency of the doppler signal in radians. The doppler frequency is equal to $$f_d = 2 \frac{v}{\lambda} \quad (5)$$

in cycles per second, and by mixing the reflected signal with a coherent source, the carrier is removed in accordance with $$KF(\omega + \omega_d - \omega_0) F(\omega_0)$$
$$= \left[ \frac{\tau \sin (\omega + \omega_d)\tau/2}{(\omega + \omega_0)\tau/2} \right] \cdot [\cos n(\omega + \omega_d)\tau/2] \quad (6)$$

Upon deriving the doppler frequency output signal at the output of mixer 74 on line 80, the signal is then applied to the gated filter circuitry 16. The gating signal may have the form $$F_z(\omega) = \tau \sin \frac{\omega(\tau/2 + t_n)}{\omega(\tau/2 + t_n)} \cos n\omega(T/2 + \tau_n) \quad (7)$$

to derive a stored replica of the modulating signal wherein each of the individual time zones or resolution cells of signal information await individual filtering. Switch 82 is a linear switch wherein no multiplication takes place, multiplication being effected at a constant rate through individual ones of the active filters in filter bank 86. The individual filters have the characteristic $$f(\omega) = \frac{1}{\sqrt{1 + \left(\frac{\omega}{\omega_c}\right)^2}} \quad (8)$$

where $\omega_c$ is equal to the sum of $\omega$ and $\omega_d$.

The filtering of the reflected signal energy in terms of time-sliced resolution cell content serves to remove all spectral lines except the first one, thus reducing the spectrum to the doppler frequency only. Output from filters in filter bank 86 then procede to the next gated switch 90 wherein signal multiplication takes place. Such multiplication can be expressed by the function $$C_{12}(t_r) = E_1(t) E_2(t - t_r) \quad (9)$$

If the output signal is further integrated, the above function becomes a cross correlation function or $$C_{12}(t_r) = \int_{-D}^{D} E_1(t) E_2(t - t_r) dt \quad (10)$$

It has been shown by Peterson, Birdsall, and Fox, "Theory of Signal Detectability" IRE Transactions No. PGIT-4, pages 171 – 212, September 1954, that a receiver which performs a cross correlation function computes the likelihood ratio; that is, a function of maximizing the output signal-to-noise ratio. The likelihood ratio may be defined as the ratio of the probability-density function corresponding to signal-plus-noise $P_{sn}(v)$ in relation to the probability-density function of noise alone, $P_n(v)$. Thus, $$L_r(v) = \frac{P_{sn}(v)}{P_n(v)} \quad (11)$$

and this constitutes a measure of how likely it is that a receiver envelope $v$ is due to signal-plus-noise as compared to noise alone.

Since the system computes the likelihood ratio, the sequential observer criteria may be used for the detection of signals. This is the most efficient criteria of all observer criteria, and the savings over the Neyman-Pearson observer factor can be computed using the methods described by Bussgang and Middleton in "Optimum Sequential Detection of Signals and Noise," IRE Transactions, volume IT-1, pages 5-18, Dec. 1955.

Figure 2:
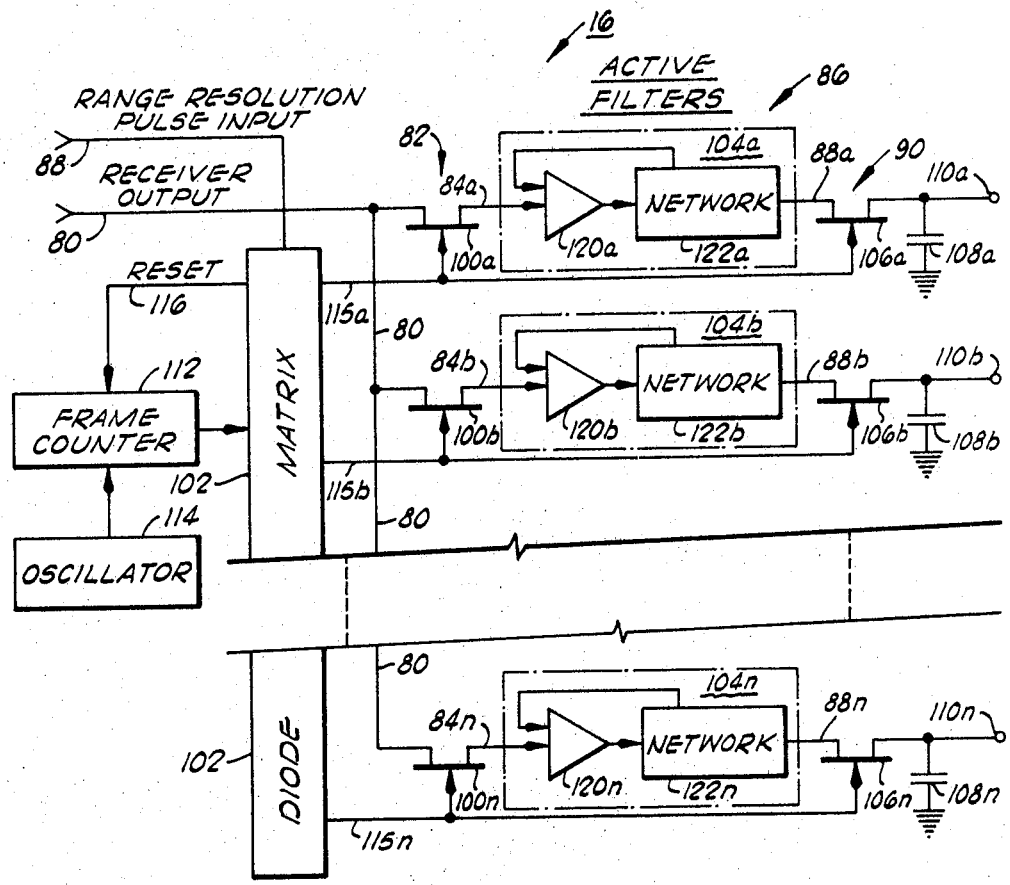
FIG. 2 is a block diagram of a specific form of switching and filter network as shown in FIG. 1.

One form of specific circuitry for carrying out the switching and filtering operation in filtering circuitry 60 is shown in FIG. 2. Thus, the switch 82 consists of a plurality of Field Effect Transistors 100a, 100b through 100n operating in conjunction with a diode matrix 102 which performs successive activation of respective field effect transistors 100a through 100n. The filter bank 86 consists of a series of active filters 104a, 104b through 104n which are energized in succession from outputs of transistors 100a through 100n, and which provide output to respective ones of Field Effect Transistors 106a, 106b through 106n which make up the switch 90. The output from base B2 of Field Effect Transistors 106a, through 106n include a grounded capacitor 108a, 108b through 108n for the purpose of providing a voltage amplitude storage function relative to outputs as available at terminals 110a, 110b through 100n.

The diode matrix 102 may be a conventional form of diode array which functions in response to pulse input from a frame counter 112 providing clock pulse output as derived from an oscillator 114. Oscillator 114 may be a division output stage of the master oscillator 36 which controls overall system timing. A reset pulse generated by completion of count in diode matrix 102 is applied via line 116 to reset the frame counter 112. The amount of count or size of diode matrix 102 will be dependent upon the designated number of resolution cells which it is desirable to utilize in system operation and, similarly, the number of active filters 104a through 104n and their respective switching networks will correspond. The range resolution pulses applied in on lead 88 will also correspond to the selection and width designation of resolution cells such that successive pulses are repeatedly clocked out of diode matrix 102 via leads 115a, 115b through 115n.

A train of doppler frequency signals, occurring as energy reflection targets appear, are applied in on lead 80 for conduction in parallel to each of the switching Field Effect Transistors 100a, 100b through 100n, which parallel transistors 100a–n are triggered on in succession by output on leads 84a–n to successive emitter terminals of 100a–n. Output from base terminal B2 of Field Effect Transistors 100a–n are then applied to the respective active filters 104a through 104n.

The active filters 104a, 104b through 104n each consist of an operational amplifier 120a, 120b–120n operating in conjunction with a regeneration feedback operation network 122a, 122b through 122n. The active filters 104a through 104n may be selected from conventional operational amplifiers which provide the desired frequency limitations. It has been found that an active filter having a pass band of 0 – 30 KHz is suitable, a frequency pass band which has been found to be ample for most weather-surface applications. However, special designs may require enlargement of the active filter passband, and this can be adjusted in accordance with the exigencies of particular applications.

Output from each of active filter networks 122a through 122n are then applied by respective leads 88a through 88n to the base B1 of field effect transistors 106a through 106n. Transistors 106a through 106n are then successively keyed by the resolution cell key outputs on leads 155a through 155n as clocked out sequentially in accordance with resolution cell size from diode matrix 102. Upon energization of respective field effect transistors 106a through 106n, amplification of doppler frequency signal, if present in the particular resolution cell, will be conducted from base B2 of respective field effect transistors 106a through 106n and, since the output from active filters 104a through 104n will be D-C in character, the respective storage capacitors 108a through 108n will store and maintain the appropriate charge relating to the particular resolution cell.

The output terminals 110a through 100n are then connected to the display circuitry directly or through timed matrix disposition, depending upon the selected display form as will be further described below.

Figure 3:
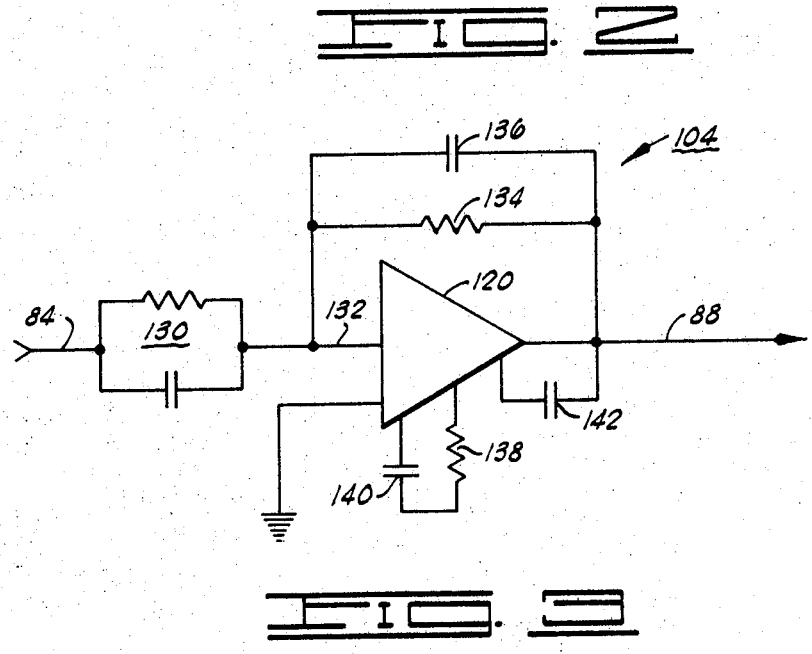
FIG. 3 is a schematic diagram of one form of active filter as employed in FIG. 2.
Figure 4:
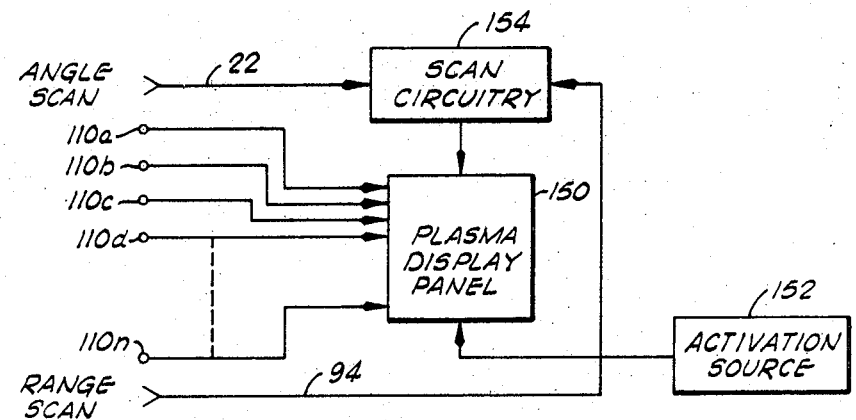
FIG. 4 illustrates one form of display structure which may be utilized in the radar system of FIG. 1.

FIG. 3 illustrates one form of active filter 104 which may be utilized in the present invention. The active filter 104 utilizes operational amplifier as connected from an intregrated circuit, motorola type MC1437P, with the required peripheral sustaining network. Thus, input from selected leads 84 is applied through a parallel resistance-capacitance network 130 for direct input to intregrated circuit amplifier 120 on lead 132. Frequency limiting output feedback is applied from amplifier lead 88 back through a parallel connected resistance 134 and capacitor 136 for connection to input lead 132. A series connected resistance 138 and capacitor 140 of adjusted value are utilized to supply regeneration, and a capacitor 142 provides positive feedback for equalization thereby to optimize the spectrum line of the past band. The connection is characteristic of the Motorala MC1437P integrated operational amplifier; however, it should be understood that there are numerous forms of active filter which can be utilized for the defined application.

Output display equipment may take any of various well-known forms but the newly developed plasma display has promise of being particularly desirable due to compatibility with the particular form of system which generates data in accordance with individual resolution cells. One form of plasma display device which would be particularly desirable in the present application has been developed by Owens-Illinois, Inc., in Toledo, Ohio, and is fully described in "Electronic Design" Vol. 13, June 24, 1971. The outputs from terminals 110a through 110n, as shown in FIG. 2, which are connected to supply the stored resolution cell data values from respective capacitors 108a through 108n may be applied directly into the scan anodes of a plasma display panel 150. The plasma display panel 150 utilizes X–y coordinated gas breakdown, i.e., electrons of the gas are caused to drop to lower energy levels, to release photons of light and achieve photo-lumineccence. An activation source 152 provides a periodic-reversing sustaining voltage, on the order of plus or minus 100 volts az, as applied to all x–y electrodes in the matrix array, the selected voltage value amounting to a threshold level which is insufficient to cause the internal gas to break down. Thereafter, application of signal from terminals 110a through 100n to selected scan anodes of the plasma display panel 150 will cause breakdown and photo-luminescent indication at the selected coordinate position. Scan circuitry 154 receives angle of scan information via lead 22 from antenna control 20 (FIG. 1), and this circuit in coaction with the scan anodes will select the proper indication positions on plasma display panel 150.

Figure 5:
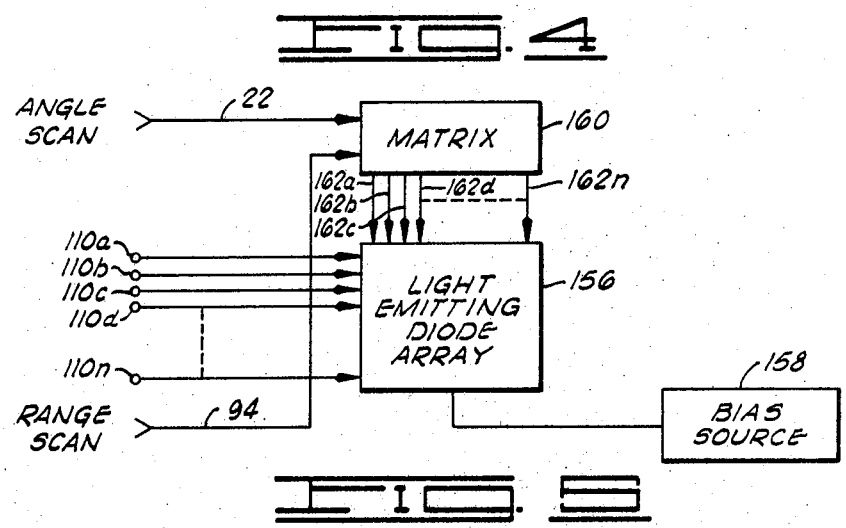
FIG. 5 illustrates an alternative form of display apparatus which may be utilized in the system of FIG. 1.

An alternative form of display is shown in FIG. 5 which utilizes a light emitting diode (LED) array 156. The light emitting diode array 156 is biased from suitable bias source 158 while receiving time-displaced inputs from terminals 110a through 110n to the successive rows of LED units within the array. A matrix 160 responsive to angle of scan information on line 22 provides successive outputs on leads 162a through 162n to supply the remaining energization columnwise of individual LED's within the array 156. Range scan input on lead 94 is utilized to synchronize matrix 160 as to column scan duration, i.e., to control the length of time during which each of column energizing leads 162a through 162n remain energized.

Figure 6:
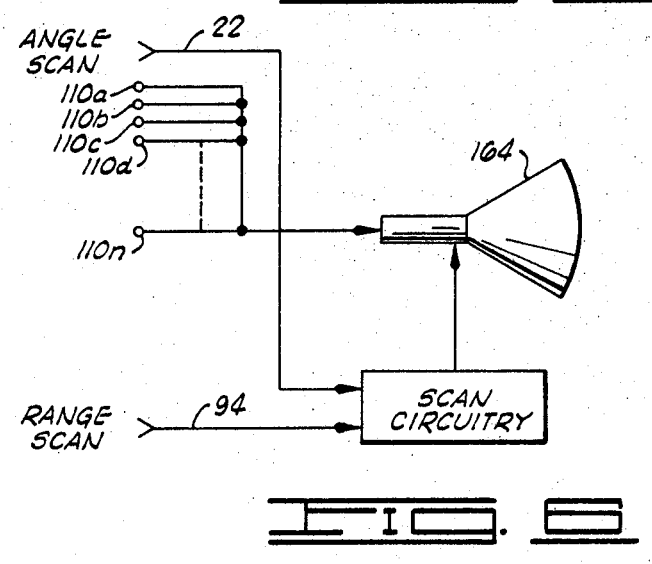
FIG. 6 illustrates still another alternative display apparatus which may be utilized in the radar system of FIG. 1.

Still another form of display, and the time-honored method would be the utilization of a cathode ray tube display as shown in FIG. 6. This is a well-known form of application utilizing a cathode ray tube 164 of selected persistance and phosphorescent characteristics. Angle scan from line 22 and range scan from lead 94 would be applied to selected scan circuitry 166 for the purpose of generating the desirable scan voltages, i.e., x–y coordinates, C-scope indication, polar coordinates and variations of angular versus range indication. Input from terminals 110a through 110n may be additive in parallel, but time-displaced as per the resolution cell division, for input to the cathode or input grid of cathode ray tube 164. The particular form of display may be varied in accordance with the requirements of the application and, in some instances, it will be desirable to provide the output indications directly into computational equipment acting independendtly from or in integration with other equipment in the craft.

The foregoing discloses a novel form of radar system which is capable of reducing required power by a very high order while sacrificing little or nothing in range and resolution. While the system has been discussed in basic form as may be utilized in general search or weather detection application, it should be understood that it is contemplated for use in various applications particularly for employ in aircraft such as ground speed indicator, height finding, terrain mapping, collision avoidance, side-viewing radar functions, to name the most obvious. It is contemplated too that recent advances in printed circuit phased array antennas make use of such equipment very desirable with respect to the present radar system. Thus, such printed circuit phased array antennas can be made relatively small and mounted easily at proper locations about an aircraft such that they can provide a very effective and discriminating energy propagation sweep, such sweep being extremely variable through electronic phase control of energization of the phased array antenna.

The present invention will enable construction of radar systems of strength, reliability and accuracy comparable with the present day systems, but it will be achieved with components of less power requirement, e.g., completely solid-state circuitry, which will enable a much less costly device in relation to present day systems. The use of solid state components will also open the door to greater versatility of signal processing since the noise with which to be contended through receiver amplification and subsequent signal processing will be greatly limited.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A method for optimization of reflected return of radar signals as employed with a radar system utilizing a transmitter and antenna propagating signal energy at a selected frequency a transmitter-receiver switch providing an output of received signal energy, and receiver circuitry providing an output I-F frequency signal including modulated frequency values differing from said I-F frequency, comprising the steps of:
   developing a comparison signal in phase coherence with said I-F frequency signal;
   mixing said I-F frequency signal and said coherent comparison signal to derive a doppler frequency signal output;
   time-slicing said doppler frequency signal output to define said received signal energy as a series of equal time-width signals wherein the time-width represents a resolution cell of said radar system;
   separately filtering each of said time-width signals to limit the frequency passband within zero frequency and the highest doppler frequency to be received; and
   displaying each of said filtered time width signals in relation to transmitted energy travel time.

2. An electronic process for deriving equivalent radio detection and ranging information for distant objects at reduced transmission output power, comprising the steps of:
   repetitively transmitting discrete pulses of signal energy at a selected frequency along a predetermined propagation path;
   receiving said signal energy reflected from said distant objects and generating an electrical signal;
   generating a coherent signal at said selected frequency which is in phase with said transmitted signal energy;
   mixing said received energy electrical signal with said coherent signal to remove all signal content at said selected frequency thereby to derive returned signals having frequencies other than said selected frequency;
   dividing said returned signals into plural, different resolution time zone signals, said time zones being disposed successively relative to the travel time of said transmitted signal energy, and each having a discrete time width;
   separately filtering each of said time zone signals to limit the frequency passband of each to a predetermined value and to generate a plurality of filtered output signals; and
   displaying said filtered output signals as separate indications each coordinated with its respective disposition relative to said travel time.

3. A radar device for detection of distant objects, comprising:
   antenna means;
   transmitter means connected to said antenna means to generate a pulsed transmission signal at a selected output frequency;
   receiver means receiving transmission signal energy from said objects and generating an output signal at a second selected frequency modulated with doppler frequency variations;
   signal generating means for producing a coherent signal in phase with said second selected frequency output signal from the receiver means;
   mixer means receiving as input said receiver means output signal and said signal generating means coherent signal to produce an output signal consisting of said doppler frequency variations;
   switching means for time gating said doppler frequency variations into a series of separate, time-displaced signal portions having finite time width;
   plural filtering means each receiving a selected one of said time-displaced signal portions, to provide a low frequency passband output signal indication; and
   display means receiving said output signal indications to provide display which is range coordinated with said time-gating.

4. A radar device as set forth in claim 3 wherein said signal generating means comprises:
   circulator means receiving a portion of said transmitter output signal to generate an output comparison signal which is coherent with the transmission signal; and second mixer means receiving as input said comparison signal to provide an output coherent signal at said second selected frequency.

5. A radar device as set forth in claim 4 wherein said receiver means includes:
third mixer means receiving said received transmission signal energy and providing said receiver means output signal;
local oscillator means providing a heterodyning output signal both to said third mixer means and to said second mixer means.

6. A radar device as set forth in claim 3 wherein said display means is a plasma display.

7. A radar device as set forth in claim 3 which is further characterized to include:
antenna control means connected to control beam energy propagation direction from said antenna means while providing representative electrical control indications to said display means.

8. A radar device as set forth in claim 7 wherein said antenna control means directs said propagated beam energy through continuous angular sweeps scanning a predetermined arc.

9. A radar device as set forth in claim 7 wherein:
said antenna means is a phased array; and
said antenna control means generates antenna phase control signals for controlling said beam energy propagation in two coordinates.

10. A radar device as set forth in claim 3 wherein said switching means comprises:
diode matrix means receiving said mixer means output signal, to generate a plurality of outputs each conducting a separate one of said time-displaced signal portions, said signal portions constituting a time-length signal which is approximately the time per resolution cell of said radar device.

11. A radar device as set forth in claim 3 wherein said plural filtering means comprise:
plural active filters including operational amplifiers and which filters have a passband from zero frequency to the highest doppler frequency to be received by the radar device.

* * * * *